Patented Sept. 26, 1950

2,524,008

UNITED STATES PATENT OFFICE 2,524,008

ADHESIVE COMPOSITION

Herman J. Deney, Buffalo, N. Y., assignor to Pierce & Stevens, Incorporated, Buffalo, N. Y.

No Drawing. Application May 3, 1946, Serial No. 667,117

3 Claims. (Cl. 260—17)

This invention relates to a new and improved remoistening adhesive composition, and more particularly to a new adhesive composition which is especially suited to be applied to uses such as in labels, pregummed tapes, sheets, fabrics, wall paper or the like, for subsequent remoistening or reactivation preliminary to final bonding of the treated article, such as hanging the wall paper or otherwise finally utilizing the adhesive.

One of the objects of the invention is to provide a new and improved adhesive composition which is characterized by the versatility of its adhesiveness to various types of surfaces. Another object is to provide an improved adhesive composition whereby smaller quantities of the adhesive may be employed in any given instance to provide a better bonding of the elements to be united.

Another object of the invention is to provide an improved adhesive composition of the characteristics hereinabove set forth which is also oil-resistant. Another object of the invention is to provide an improved adhesive composition wherein the relative proportioning of the elements thereof may be varied and regulated so that the composition will act favorably under different remoistening conditions, whereby good adhesion will always be obtained.

Another object of the invention is to provide an improved adhesive composition which is particularly suited to constitute the adhesive means in "pregummed" sheets, labels, tapes, wall paper or the like, wherein the adhesive is to be remoistened preliminary to final use of the treated article. Another object of the invention is to provide an improved adhesive composition of the advantages aforesaid which is particularly adapted to wall paper use and is also characterized by being unattractive to carnivorous vermin or the like such as sometimes attack conventional wall paper pastes. Other objects and advantages of the invention will appear from the specification hereinafter.

The invention contemplates broadly a new adhesive composition comprising a mixture of a water soluble polymer of cellulose derivative type and a water soluble vinyl polymer; the mixture being compounded as an aqueous solution wherein the relative proportions of the solids ingredients thereof may be varied somewhat to attain the desired adhesive characteristics. Also, the ingredients thereof may be selected to be of various characteristics, depending upon the qualities desired in the final composition. For example, the cellulose derivative polymer may comprise sodium-carboxymethylcellulose (which will be referred to hereinafter as CMC for the sake of brevity) and this may be of either low, medium, or high viscosity, as described in the Hercules Powder Company Technical Bulletin form No. 500–18 entitled "Sodium Carboxymethylcellulose"; and the vinyl polymer may comprise poly vinyl alcohol (which will be hereinafter referred to as PVA for the sake of brevity) and this may be of either low, medium, or high viscosity, depending upon the viscosity characteristics and solids content required to procure proper deposition on the surfaces to be cemented. The completely hydrolyzed type of PVA is preferred.

For example, an adhesive of the invention may be compounded to comprise approximately even parts of CMC and PVA; but according to the reactivation characteristics desired the proportions may be substantially varied. For instance, if it is desired to increase the "slip" characteristics the relative amount of solids content may be increased by employing a lower viscosity PVA while using the same ratio of PVA to CMC. Or, the "slip" characteristics may be modified by employing more or less PVA without changing the viscosities of the PVA and CMC. However, the ratio of CMC to PVA will be primarily determined by the bonding characteristics desired in the final composition; that is, the characteristics determining the speed with which reactivation is required to be established; and it is a particular feature of this invention that the adhesive composition thereof may be compounded to possess a wide range of ratio of instant reactivation to retarded reactivation without affecting the final adhesion strength. This is because it is the CMC ingredient of the composition of the invention that provides the quick adhesion characteristics while the PVA content provides the retarded adhesion characteristics; and thus in accordance with the invention adhesives may be compounded within wide ranges of instant vs. retarded reactivation characteristics, while in any case the final bond obtained is substantially of maximum strength.

To further illustrate the invention by means of a typical formula which may be followed in preparing the new adhesive, the following example is given to illustrate a workable formula with the understanding that the proportions shown are merely illustrative and may be varied considerably:

*Example*

| | Per cent |
|---|---|
| Poly vinyl alcohol (completely hydrolyzed) such as Du Pont RH-391 "high viscosity type" by weight | 3 |
| Sodium carboxymethylcellulose, known as Hercules "CMC" low viscosity type by weight | 3 |
| Water | 94 |

Other examples of suitable water-soluble polymers of cellulose derivative type are methylcellulose and hydroxyethylcellulose; and another suitable water-soluble vinyl polymer is sodium acrylate polymer. Also, in addition to the ingredients set forth hereinabove, a water-soluble plasticizer may be employed if desired in order to give the cemented wall paper or other article to which adhesive is applied a desired degree of flexibility subsequent to drying and setting of the adhesive. Thus, drying-out stresses will be avoided, and the cemented articles may successfully withstand some degree of flexing. Suitable plasticizers for this purpose are poly ethylene glycol and poly hydric alcohol, such as glycerine, sorbitol, glycol.

It is a special feature of the present invention that the adhesive composition thereof avoids migration and/or dissipation in a remoistening liquid because of the tendency of the vinyl polymer ingredient to simply swell up when remoistened, as distinguished from dissolving into the remoistening liquid. On the other hand, the cellulose derivative polymer dissolves readily and absorbs water quickly and thereby provides good initial adhesion characteristic for the total composition, while the vinyl polymer swells up and stays in place, thereby promoting improved final cementing. Therefore, the permissible time elapse between the steps of remoistening the adhesive and of hanging the wall paper is substantially extended; and as a matter of fact, a "pregummed" wall paper of the present invention may be dipped for either only a few seconds or for many minutes in a bucket of water, and in any case maximum final adhesion strength will be obtained.

Another feature and advantage of the adhesive of the invention is that its bond strength is less susceptible to moisture than in the case of starch type adhesives, and that therefore the adhesive characteristics of the present invention are better retained than in the case of starch type adhesives under increased humidity conditions. Consequently, it will be understood that the adhesive of the present invention may be employed in the case of pre-gummed wall papers and the like by less skilled paper hangers while nevertheless producing uniformly good results.

Another feature of the adhesive of the invention is that the materials thereof are not appreciably susceptible to deterioration in the presence of bacteria or adverse climatic conditions, and that therefore any available water may be employed for remoistening, such as river water or the like. On the other hand, starches and animal and vegetable glues and gums such as are known as amylaceous materials are usually susceptible to deterioration under conditions set forth hereinabove, and therefore require either modification or additions of preservatives thereto such as in themselves invariably limit the life of a composition of that character.

Thus, it will be appreciated that the invention provides a novel adhesive composition possessing many important features and advantages over prior art compositions, such as to render the composition of the invention advantageous for use in a large variety of applications in addition to the specific application to remoistening wall papers or the like as hereinabove set forth; and that although only one form of the invention has been shown and described in detail it will be apparent to those skilled in the art that the invention is not so limited but that various changes may be made therein without departing from the spirit of the invention or the scope of the appended claims.

What is claimed is:

1. As a remoistening adhesive, an aqueous solution containing equal proportions of sodium carboxymethylcellulose and polyvinyl alcohol solely as the adhesive ingredients.

2. As a remoistening adhesive, an aqueous solution containing equal proportions of sodium carboxymethylcellulose and polyvinyl alcohol solely as the adhesive ingredients and a water soluble polyhydric alcohol as a plasticizer.

3. As a remoistening adhesive, an aqueous solution containing equal proportions of sodium carboxymethylcellulose and polyvinyl alcohol solely as the adhesive ingredients, each ingredient being present to the extent of 3%.

HERMAN J. DENEY.

REFERENCES CITED

The following references are of record in the file of this patent:

Industrial and Engineering Chemistry; article by Hollabaugh et al.; vol. 37, No. 10, October 1945, pages 943–947.

"PVA": R. & H. Technical Bulletins; by E. I. Du Pont De Nemours and Co., copyright 1940, pages 4 and 5.